June 29, 1954

G. V. TAPLIN ET AL 2,682,510

GAMMA AND X-RAY DOSIMETRIC METHOD

Filed April 26, 1950

INVENTORS.
GEORGE V. TAPLIN
CLAYTON H. DOUGLAS
BY

ATTORNEY.

June 29, 1954

G. V. TAPLIN ET AL 2,682,510

GAMMA AND X-RAY DOSIMETRIC METHOD

Filed April 26, 1950

INVENTORS.
GEORGE V. TAPLIN
CLAYTON H. DOUGLAS
BY
Roland A. Anderson

ATTORNEY.

UNITED STATES PATENT OFFICE 2,682,510

GAMMA AND X-RAY DOSIMETRIC METHOD

George V. Taplin, Los Angeles, and Clayton H. Douglas, Alhambra, Calif., assignors to the United States of America as represented by the United States Atomic Energy Commission Application April 26, 1950, Serial No. 158,282

1 Claim. (Cl. 252—408)

This invention relates, in general, to the measurement of X ray or gamma radiation quantities and more particularly, to the colorimetric dosimetry of such radiation.

The problem of radiation measurement was initially encountered shortly after the discovery of natural radioactivity by the Curies and Becquerel and of X rays by Roentgen during the latter part of the last century. The earliest measuring methods employed the color changes induced in materials containing platino cyanide of barium as the sensitive material. Various disadvantages attend the use of this material since the material quickly reverts to its original color upon exposure to light and the color standards of the comparator charts gradually fade leading to inaccurate estimations of the amount of radiation.

Early in the present century, a mixture of iodoform and chloroform was employed in measuring radiation doses but the reaction was also sensitive to heat, light and oxygen and was not proportional to dosage.

Gunther, in 1928, reported that, when chloroform is irradiated with X rays or the gamma rays of radium, hydrochloric acid is liberated in amounts proportional to the radiation energy transmitted. Numerous other radiation induced reactions have been reported by various investigators. However, the great bulk of these reactions require exposure to tremendous quantities of radiation, values in the range of kilo roentgens being of the usual order and, accordingly, the reactions are not sufficiently sensitive to be used for measuring small quantities of radiation.

Acid evolution from aqueous solutions of chloroform or from chloroform containing small quantities of water is far greater than the amount which could be caused by secondary ionization alone. It has been postulated that a chain-type reaction, in which the production of acid is enhanced in the presence of water (or alcohol), is induced by the penetrating radiation. Although the high sensitivity of this reaction and the products of the reaction have been known for many years, this reaction does not appear to have been applied to dosimetry due, perhaps, to unreliability attendant upon the unstable characteristics of such a reaction.

With the present widespread industrial usage of high energy X ray equipment, the employment of large numbers of individuals in the vicinity of nuclear fission reactors, of particle accelerators and of highly radioactive tracer materials and the possibility that large segments of a population may be exposed to the effect of atomic explosions, there has arisen a pressing need for inexpensive, simple, rugged and dependable methods and apparatus for accurately measuring cumulative dosages of radiation.

Observations of the effects of gamma and X ray radiation based on the effects of atomic bomb radiation upon individuals, the results of animal experiments and effects on patients receiving total-body radiation for therapeutic purposes indicate the necessity for making reliable determinations in the range of a few roentgens to about a thousand roentgens. Reliable determinations outside this range may also be useful for calibrating equipment, measuring dosages accurately, and for other purposes.

Exposures of humans to quantities of X ray and gamma radiation in the range of 200 roentgens or less may be expected to produce transient decreases in the circulating white blood cells followed by complete recovery in nearly all individuals. Radiation exposures in the range of 200–400 r. units cause a moderately severe fall in white cells, platelets and red cells, with severe nausea, vomiting, diarrhea and moderate hemorrhagic manifestations. A small fraction of individuals receiving dosages in this range would be likely to succumb in the immediate period following exposure. Radiation dosages in the range of 400–600 r. units would nearly always produce serious symptoms in the individual including all of the symptoms and manifestations of the radiation syndrome and with a mortality in the neighborhood of about 50% of the individuals exposed. Exposure to dosages above about 600 r. units may be expected to be almost certainly fatal.

Since no post-exposure medical diagnostic method is known which permits determination of the degree of exposure to within 50 to 100% more than values in the range of about 500 or 600 r. units, the necessity of providing a simple means for classifying individuals in accordance with the amount of radiation received, in the event of widespread exposure, is apparent. In the absence of such a means, supportive therapy might well be wasted on individuals who had received dosages far in excess of those amenable to medical measures.

Usual monitoring devices will not accurately measure X-ray or gamma radiation having a broad energy range of the order, 0.1 to 10.0 m. e. v. Moreover, electronic equipment employing ionization chambers and sensitive amplifying circuits are expensive and subject to large errors induced by mechanical jarring and temperature, barometric and humidity changes. Electroscopes generally have only a narrow range and are much too sensitive. Photographic film devices require time-consuming and cumbersome negative development and densitometric operations.

It appears that in order to utilize the chemical reactions produced by penetrating irradiation in a colorimetric dosimeter, it is imperative that the reagents be shockproof and stable under wide variations of temperature, exposure to light, ultraviolet light and other relatively long electromagnetic radiation. A personnel or area irradiation measuring device should be unaffected by such factors for 24–48 hours following irradiation and six months or more prior to such exposure.

Now it has been found that, by providing a suitable two-phase system comprising an aqueous dye solution in contact with a low-molecular weight chlorinated hydrocarbon, a stable, reliable, radiation-sensitive system is obtained which indicates exposure to predetermined quantities of X-ray or gamma radiation by undergoing a color change. Moreover, it has been found that the sensitivity of the determination can be closely controlled by selection of suitable volume ratios of aqueous phase to organic phase, regulation of the indicator dye concentration and adjustment of the pH of the aqueous phase.

Accordingly, it is an object of the invention to provide methods for determining quantities of X-ray and gamma irradiation.

Another object of the invention is to provide colorimetric methods for indicating exposure to predetermined quantities of X-ray and gamma irradiation.

Still another object of the invention is to provide a highly stabilized two-phase solution system for colorimetrically indicating exposure to predetermined quantities of X-ray and gamma irradiation.

A further object of the invention is to provide methods for controlling the sensitivity and for calibrating a two-phase solution system for colorimetrically indicating exposure to predetermined quantities of X-ray and gamma irradiation.

A still further object of the invention is to provide a two-phase solution, colorimetric-dosimetric system for X-ray and gamma irradiation which is physically insensitive to changes in temperature and is chemically stable on exposure to heat.

Other objects and advantages will become apparent from the following description taken in connection with the accompanying drawing of which:

Figure 4:
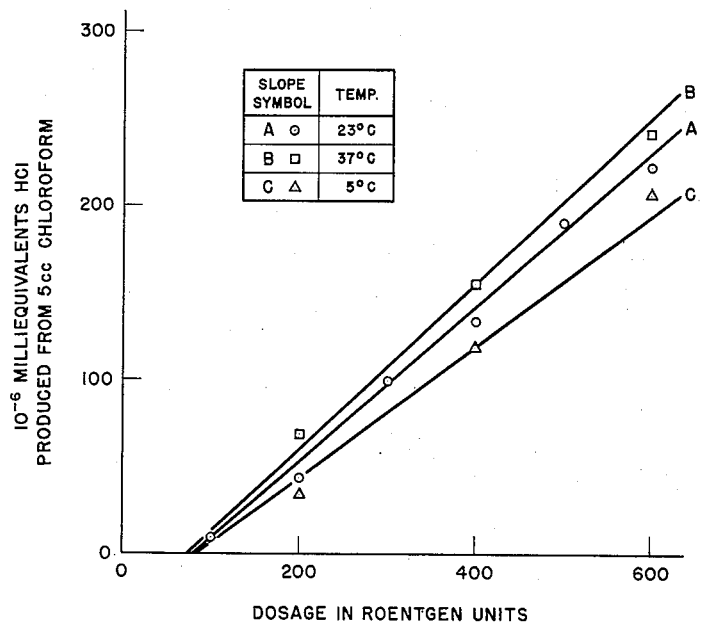
Figure 5:
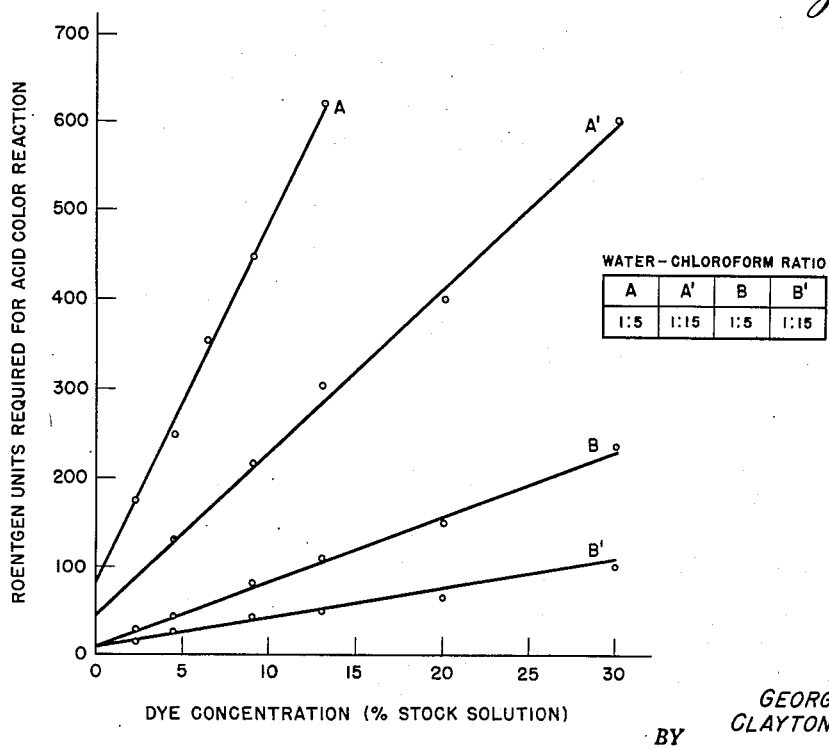

Fig. 4 is a graphical illustration of the effect that different temperatures of the chloroform produce upon the amounts of hydrogen chloride evolved from chloroform by various quantities of irradiation; and Fig. 5 is a graphical illustration of the effect that different dye concentrations in the aqueous phase and different aqueous-phase to chloroform volume ratios produce in the amount of irradiation which is required to produce a color change of the indicator dye.

In accordance with the invention a colorimetrically-indicating, two-phase solution system for measuring quantities of X-ray or gamma radiation comprises a low-molecular weight chlorinated hydrocarbon layer in contact with an aqueous phase containing a suitable acidimetric indicator dye. Upon irradiation with gamma or X-rays, quantities of hydrogen chloride are evolved in the chlorinated hydrocarbon layer and are quickly and preferentially extracted into the aqueous phase. As soon as the predetermined quantity of irradiation is exceeded the indicator dye undergoes a color change thereby indicating exposure to said predetermined quantity of irradiation.

In practicing the invention it has been found that low-molecular weight liquid hydrocarbons such as carbon tetrachloride, chloroform, ethylene dichloride, tetrachloroethylene, and other similar compounds may be employed as the material which evolves the hydrochloric acid. However, chloroform appears to possess the requisite properties to a higher degree than do other members of the group and is preferred.

For the purposes of the invention, chloroform, carbon tetrachloride and other of the chlorinated hydrocarbons as supplied commercially were found to be relatively unstable at temperatures above about 37° C. This instability appears to be promoted by the presence of extraneous materials such as alcohol, which are added by the manufacturers as preservatives, acidic substances remaining from the manufacturing process or which are evolved during storage, or basic substances such as sodium hydroxide which is added to the chloroform alcohol mixtures or which may be extracted from soft glass containers. Accordingly, any such system which includes these materials will yield unreliable results. (This circumstance may serve to explain the failure of previous investigators to apply this reaction to the dosimetry of X and gamma irradiation.) However, it was found that highly reliable results were obtained if the chloroform was carefully washed with dilute sodium hydroxide solution (about 0.01 N) and rinsed several times with distilled water and the materials were exposed in boro-silicate glass (Pyrex glass) or polyethylene containers. The important factors for the stability of the chlorinated hydrocarbon materials following purification and during storage prior to incorporation into the dosimetric system of the invention appear to be the absence of alcohol and/or low-molecular weight ketones or aldehydes and of acidic or basic materials or materials which release acidic or basic substances. Chloroform prepared and exposed as described above, i. e., as a separate phase in contact with an aqueous phase, has been found to be quite stable even at temperatures as high as 56° C.

However, despite the stabilizing effect of the aqueous phase, in view of the effect of acidic or basic materials upon the stability of the material of the organic phase it is advantageous to employ in contact with the chlorinated hydrocarbon phase an aqueous phase which has a pH value near neutral since a large deviation therefrom might be expected to unfavorably influence the stability of the chlorinated hydrocarbon material. Moreover, it was noted that the pH of distilled water shaken in contact with chloroform was neutral or slightly alkaline ranging between pH 7.2 and 7.4. Accordingly, indicators which change color in nearly neutral solutions may be employed. Brom thymol blue, chlorophenol red and brom cresol purple all appear to be satisfactory for the purpose; however, brom cresol purple is preferred since a more easily noted color change occurs with this indicator dye. Moreover, chloroform overlayered with aqueous solutions of these dyes is stable at 56 to 58° C. for at least twelve weeks while the same systems are resistant to near freezing temperatures (3° C.) and to frequent shaking before and after exposure to X and gamma irradiation. Also it was found that aqueous solutions of these dyes are not affected by either X or gamma irradiation with doses of at least as high as 3000 roentgen units. Exposure of the system to artificial light produces no significant reaction; however, actinic radiation including some visible light and ultraviolet light appears to cause a slow evolution of acid and, accordingly, the system should be suitably shielded from exposure to such radiation.

As noted above, upon irradiation with either X or gamma rays, hydrogen chloride is evolved in the chlorinated hydrocarbon layer in an amount substantially directly proportional to the total amount of irradiation. This hydrogen chloride is preferentially extracted into the aqueous layer causing a rapid decrease in the pH of said layer and an eventual color change in the acidimetric indicator.

It has been found that the sensitivity of the system may be adjusted by the following methods:

1. By increasing the ratio of chlorinated hydrocarbon to aqueous phase, the sensitivity is increased.
2. The sensitivity of the system to irradiation is decreased in almost direct proportion to an increase in the concentration of the dye in the aqueous phase.
3. Adjusting the pH of the aqueous phase to a value near the lower end point of the range of the indicator increases the sensitivity of the system.

Sensitivity to amounts of irradiation of less than about as little as five roentgen units have been obtained in systems employing relatively high volume ratios of chloroform to water, such as 15:1, and rather low concentrations of dye in the aqueous phase. With the same volume ratios of the phases and with high concentrations of the dye in the aqueous phase, the sensitivity may be decreased to values in the range of about 500–600 roentgen units. Of course, the sensitivity may be reduced still further by varying volume ratios, dye concentrations and the pH of the aqueous phase. However, it is to be noted that high volume ratios of chloroform to aqueous phase and high dye concentrations provide a range of sensitivities and other desirable properties which are particularly suited to populace and personnel casualty monitoring.

The linear relationship between the amount of hydrogen chloride evolved from chloroform saturated with water and the amount of irradiation together with the effect of glass adsorption and volume differences upon acid evolution are indicated in the following experiment:

EXPERIMENT I 1 cc. volume of a saturated chloroform solution of distilled water in 2 cc. Pyrex volumetric vials and 5 cc. volumes in 7 cc. Kimble glass weighing bottles were irradiated with various quantities of 85 and 250 kilovolt X rays and radium gamma rays with the results indicated in Fig. 1. The ground-joint of the glass stoppers of the containers were sealed and lubricated with silicone high-vacuum lubricant to prevent leakage of the chloroform during irradiation.

In this and the following experiments and examples, the sources of the radiation were as follows:

The gamma rays were derived from a source obtained from the U. S. Bureau of Standards which had a radium equivalent of 9.65 mg. in a platinum-iridium capsule with an inherent filtration equivalent of 0.5 mm. platinum. This source emitted gamma rays of 0.7 m. e. v. average energy at the rate of 8.4 r./hour at 1 cm. per 1 mg. of radium content. The value of 10.06 mg. of radium was employed in the calculations in order to correct for the Thuringian glass factor of the calculations of the original calibration of the source by the Bureau of Standards. A formula based on the inverse square law with corrections for the geometry of the sample in relation to the radium source was employed to calculate the roentgen values of the radium gamma irradiations.

The 250 kv. X rays were derived from a Picker industrial X ray unit operated at 250 kilovolts and 15 ma. with an inherent filtration calculated at 0.21 mm. copper. The irradiation was accomplished at a distance of 35 cm. (source to target) unless otherwise stated.

The 85 kv. X rays were derived from a Picker X ray field unit operated at 85 kilovolts and 5 ma. which had an inherent filtration calculated as equivalent to 0.5 mm. of aluminum. A source to target distance of 15 cm. was used in irradiating the samples.

Radiation quantities were measured in air at the sample sites with a Victoreen Model 70 r.-meter, fitted with appropriate thimble chambers dependent upon the dosage rate.

After irradiation, 0.5 ml. of 4.5% brom cresol purple solution was added to each 5 cc. volume and the mixture was shaken and titrated with alkali until subsequent shaking failed to indicate acid in the dye phase.

Figure 1:
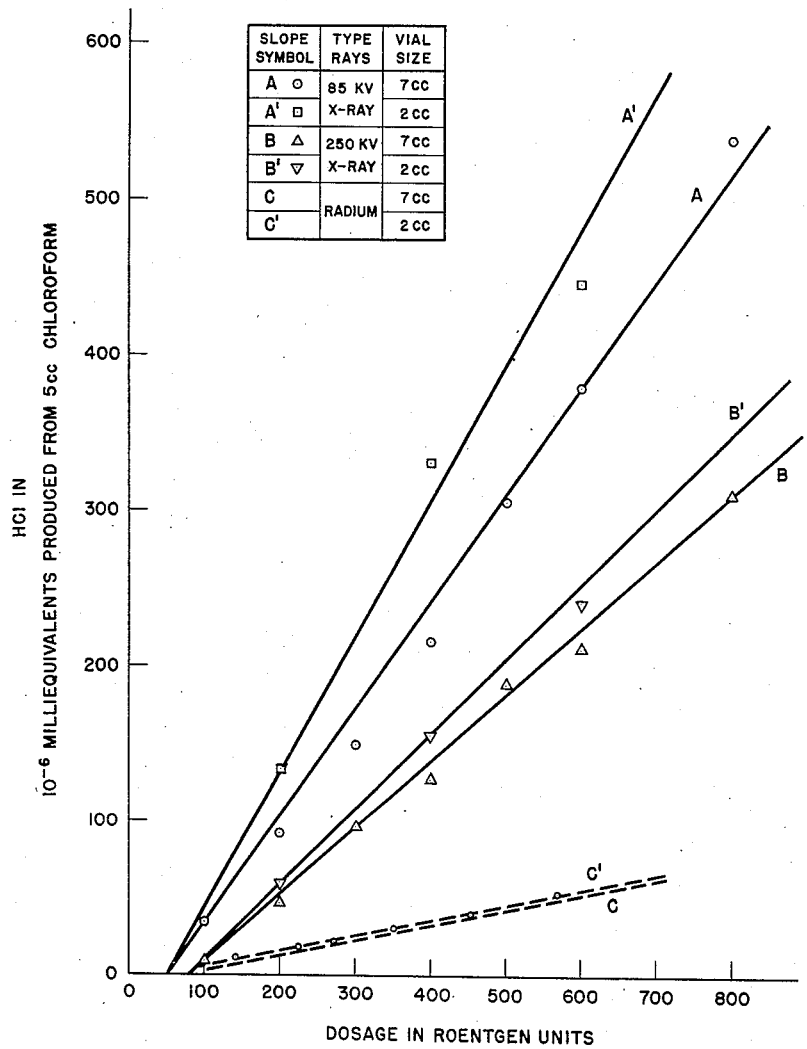
Figure 1 is a graphical illustration of the linear relationship between the amounts of irradiation and the quantities of hydrogen chloride evolved from chloroform and also indicates the effect of differences in sample sizes.

With reference to the graph of Fig. 1, the dosage in roentgen units is indicated along the abscissae scale and the amounts of hydrogen chloride evolved by the irradiation are indicated in units of millionths of milliequivalents along the ordinate scale. The values for hydrogen chloride obtained by irradiating the 11 cc. sample were multiplied by five and plotted on Fig. 1, as for the 5 cc. values, in order to simplify comparison.

As may be noted from said graph, the lower voltage radiation produces relatively greater quantities of acid than do the higher voltage X and gamma rays. Sample size has a similar effect, the larger sample evolving proportionately less acid. However, the linear proportionality of the amount of acid evolved relative to the extent of irradiation is clearly indicated.

EXPERIMENT II

The effect of variations in wave length upon the amount of acid produced by gamma and X ray irradiation was determined by irradiating 5 cc.

samples of saturated chloroform solution of distilled water with heterogeneous beams suitably filtered to provide mean effective wave lengths equivalent to wave lengths of monoergic beams absorbed to the same extent by the filtration factors indicated in the following table and with the results indicated in Fig. 2. (The curves of Fig. 2 were obtained employing the conditions indicated in the table.) Irradiation was with the 250 kv. machine 15 ma., 21 mm. Cu inherent filtration and a source to sample distance of 35 cm.

Table
MEAN EFFECTIVE WAVELENGTH FACTORS

| Slope, Symbol | Type Rays | Filters, mm. | | | Wave Length ($\lambda$), Å. |
| --- | --- | --- | --- | --- | --- |
| | | Cu | Al | Pb | |
| A | 100 kv. X ray | .46 | 1.0 | 0 | .26 |
| B | 250 kv. X ray | .46 | 1.0 | 0 | .19 |
| C | 250 kv. X ray | .21 [1] | 1.0 | .6 | .065 |
| D | Ra | .5 Pt | | | .0155 |

[1] And .5 mm. parabolic.

Figure 2:
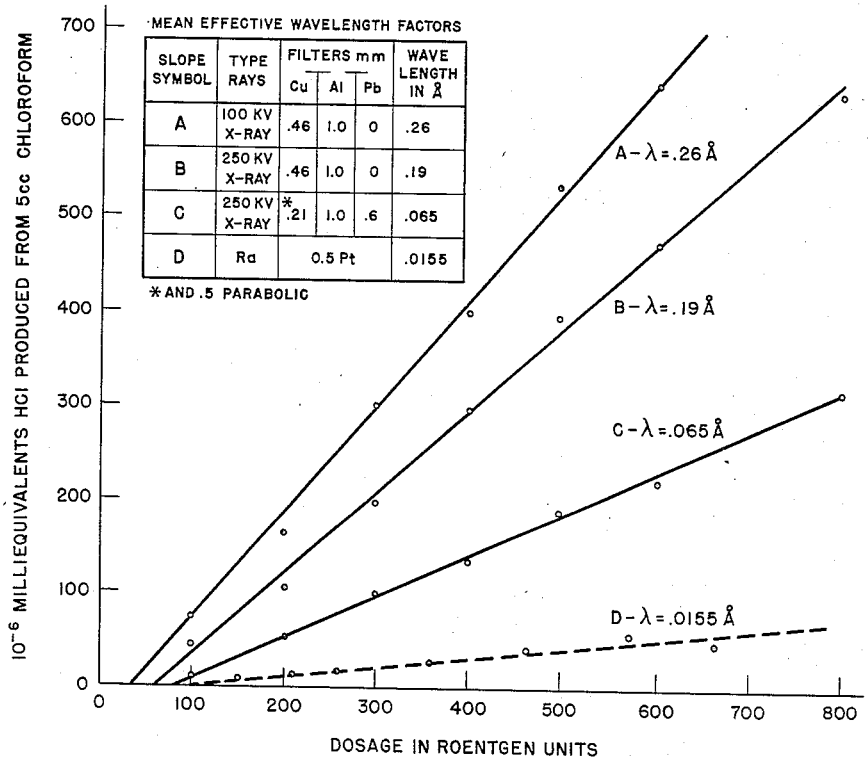
Fig. 2 is a graphical illustration of the amounts of hydrogen chloride evolved from chloroform upon irradiation with different quantities of X-rays of different wave lengths.

With reference to Fig. 2, the amounts of hydrogen chloride evolved by the chloroform solution of water are indicated in millionths of milliequivalents along the ordinate scale and the amounts of irradiation are indicated in roentgen units along the abscissae scale.

In order to more clearly demonstrate the dependence of the amounts of acid evolved by different quantities of irradiation upon wave length, the tangents of the slopes of Fig. 2 were calculated thereby yielding the rate of acid production per roentgen of radiation at each wave length. These values are plotted in the graph and are indicated in the table of legends of Fig. 3.

Figure 3:
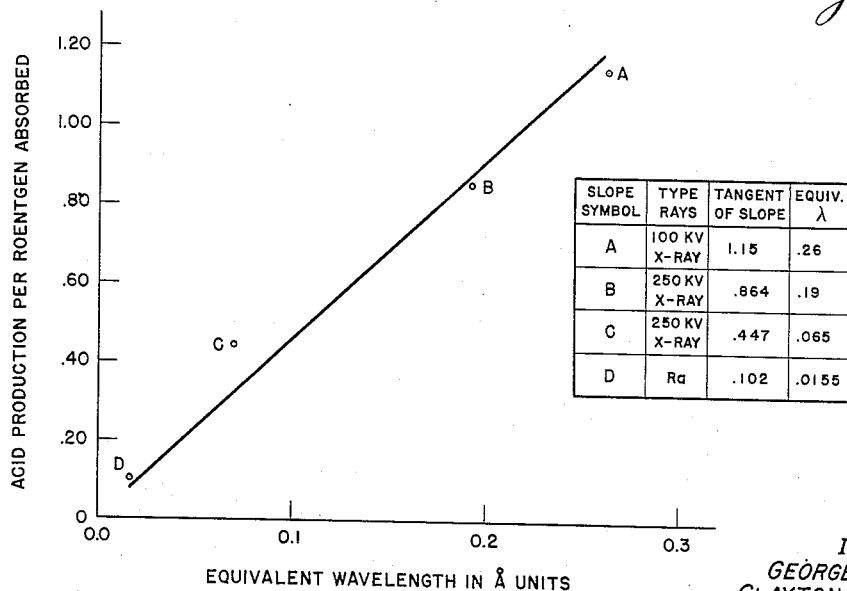
Fig. 3 is a graphical illustration of the dependence of acid production per roentgen of irradiation upon the effective wave length of the radiation.

With respect to Fig. 3, the rate of acid production in units of millionths of milliequivalents per roentgen absorbed is indicated along the ordinate seals while the equivalent wave length in Angstrom (Å.) units is indicated along the abscissae scale.

As may be seen from Fig. 2, acid production in irradiated chloroform solutions of water is dependent in a linear fashion upon the wave length of the radiation.

EXPERIMENT III

The effect that temperature differences of the irradiated saturated chloroform solution of water produce with respect to the amount of hydrochloric acid evolved was determined by irradiating 5 cc. volumes of the solution while they were maintained at 5°, 23° and 37° C. with X rays, 250 kilovolt, 15 ma., and a source to object distance of 35 cm. Filtration factors for the irradiation were 0.21 mm. Cu inherent, 0.5 mm. Cu parabolic, 0.8 mm. Pb and 1.0 mm. Al and the samples were prepared and titrated as described above.

The results of this experiment are graphically illustrated in Fig. 4 wherein the amounts of hydrogen chloride evolved are indicated along the ordinate scale (millionths of milliequivalents) and the dosage of irradiation is indicated in roentgen units along the abscissae scale.

As may be seen from said Fig. 4, more acid is produced as the temperature of the chloroform is raised from 5° to 37° C. However, the differences in the amount of hydrogen chloride produced in raising the temperature of the chloroform solution from 23° to 37° C. are relatively small compared to the variations caused by differences in wave length.

EXPERIMENT IV

Varying the rate of irradiation with X rays produces little, if any, effect upon the amount of acid evolved as determined by irradiating 5 cc. volumes of chloroform solutions of water in 7 cc. Kimble glass weighing bottles, the glass stoppers of which were sealed with silicone high-vacuum lubricant, with 250 kilovolt X rays with filtration factors of 15 mg. and 0.21 mm. Cu, 5 mm. parabolic Cu, 0.6 mm. Pb and 1 mm. Al. Samples were irradiated in quadruplicate at a source to sample distance of 245 cm. yielding a rate of 0.5 r./min. and a distance of 35 cm. yielding a rate of 25 r./min. and with total dosages of 100 and 150 roentgens. Deviations from the mean of less than 10% were obtained for the various groups of samples. The results of this experiment are summarized in the following table:

| Dosages in Roentgens | Rad. Rate, r./min. | HCl Evolved, m. e. q. | Rad. Rate, r./min. | HCl Evolved, m. e. q. |
| --- | --- | --- | --- | --- |
| 100 | 0.5 | .000013 | 25.0 | .000012 |
| 150 | 0.5 | .000030 | 25.0 | .000028 |

As may be seen from the table the variation in the rate of irradiation is relatively ineffective in producing a substantial variation in the amount of acid evolved. This finding is of considerable importance since it indicates the stability and attendant reliability of such a system. In the presence of alcohol and/or alkali or acid, the acid evolution is very erratic therefore, indicating a most undesirable instability.

EXPERIMENT V

Sensitivity variations, as determined by the amount of irradiation which is required to cause a color change in the acidimetric indicator of the two-phase system, and as produced by different dye concentrations and different water phase-chloroform volume ratios, were studied as indicated in the following:

A standard acidimetric indicator dye solution of forty milligrams of brom cresol purple per 100 ml. of water was prepared by dissolving the forty mgm. of dye in 75 cc. of distilled water and adjusting the pH of this solution to 7.25 with 0.01 N sodium hydroxide solution, then diluting to 100 cc. and again adjusting the pH to 7.25. Aqueous phases were prepared by further diluting this standard solution, and in the following, the composition of these phases will be indicated as volume/volume dilutions in percentage of this solution with respect to water as 100%.

Analytical reagent grade chloroform, washed with a one-fourth volume of 0.01 N sodium hydroxide solution and triple rinsed with distilled water, was used for the organic phase.

pH determinations were made either, electrometrically, with a Beckman glass electrode pH meter, Model G, or, colorimetrically, with the La Motte indicator dye method and equipment.

The two-phase systems were enclosed in 2 ml. Pyrex volumetric tubes sealed with silicone and were placed horizontally and X-rayed from above. Systems employing phase ratios of 1:5 and 1:15, water to chloroform, and with various dye concentrations as indicated in the following table were irradiated.

Table

| Dye, percent | 2.25 | 4.5 | 9.0 | 13 | 20 | 30 |
|---|---|---|---|---|---|---|
| pH | 6.60 | 6.80 | 6.88 | 6.95 | 7.10 | 7.20 |

0.1 cc. of aqueous dye phase and 1.5 cc. of chloroform were employed in the 1:15 systems and 0.3 cc. of dye phase and 1.5 cc. of chloroform in the 1:5 systems. The color change of purple to yellow was noted in each case. A 2.25% dye solution represents 0.9 mg. per cc. and a 30% dye solution represents 12 mg. per cc.

Results of this experiment are indicated in Fig. 5. With reference to Fig. 5, slopes A and B are for the 1:5 volume ratios and A' and B' are for the 1:15 ratios. Slopes A and A' were obtained upon irradiation with radium gamma rays with 0.5 mm. Pt filtration as noted above, and slopes B and B' were obtained with 85 kilovolt, 5 ma. X rays with 3 mm. Al filtration and a source to object distance of 15 cm. Radiation quantities required to produce the acid color reaction are indicated along the ordinate scale while dye concentration in percentage volumes of the standard solution added to distilled water are indicated along the abscissae scale.

As may be seen from Fig. 5, with increasing dye concentrations and increasing water to chloroform ratios, greater amounts of irradiation are required to produce a color change. Increases in the amount of sodium hydroxide in the aqueous phase may be expected to produce the same results. Also the dye concentrations and volume ratios may be modified either outside the values shown or to values intermediate between those shown thus providing a very flexible and comprehensive method for determining radiation quantities over wide ranges of wave lengths, rates, quantities and under various temperature conditions. The effect of absolute volume changes may likewise be employed.

In view of the flexibility and adaptability of the system, the system may be easily incorporated into devices for calibrating X ray or gamma sources, for indicating the extent of irradiation with such radiation and for other similar purposes.

For example, such a two-phase system may be enclosed in small Pyrex glass bottles with glass or polyethylene stoppers lubricated and sealed with silicone and protected exteriorly with wrappings of plastic tape or with sealing wax to provide area monitoring devices. Thick-walled Pyrex glass capillary tubes may be cut and sealed to provide suitable containers for personnel casualty badges. Suitable shielding from ultraviolet and soft penetrating radiation may also be provided.

In order to provide a device suitable for classifying individuals in the event of widespread exposure to such radiation as discussed above, a suitable series of such systems may be incorporated in a series of containers as follows:

A system which undergoes a color change of purple to yellow when irradiated with about 200 r. of radium gamma rays comprises 1.5 cc. of chloroform plus 0.1 cc. of a 9.0% aqueous dye solution prepared as above. For 400 r. the same phase ratio (1:15) but with a 20% aqueous dye solution may be used; for the measurement of 600 r., the same phase ratio (1:15) and 30% dye are satisfactory.

In a device in which the three systems, indicated above, are employed (which device may also incorporate color standards) and which was carried by a person exposed to 200 r. units of 0.7 m. e. v. gamma radiation (as from a radium source), the first tube would be changed to a yellow color, the others remaining unchanged. 600 r. or more units would cause all of the tubes to turn yellow or colorless. With an intermediate value such as 350 r. units the first tube would be yellow, the second a faint violet or light gray, and the third would be purple. With 150 r. units the first tube would be light gray or violet and the others would be purple.

While there has been described what are at present considered to be preferred embodiments of the invention, it will be understood that various modifications may be made therein and it is intended to cover all such modifications as fall within the scope of the appended claim.

We claim:

A gamma and X-ray dosimetric system disposed within a sealed inert container consisting essentially of a two phase liquid composition, one phase being chloroform and the other phase being an aqueous solution of an indicator dye selected from the group consisting of brom thymol blue, chlorophenol red and brom cresol purple, said aqueous solution having a pH in the range of about 6.6 to about 7.2 and containing about 0.9 mg. per cc. to about 12 mg. per cc. of dye, the volume ratio of the chloroform to the aqueous phase being in the range of about 5:1 to 15:1.

References Cited in the file of this patent

UNITED STATES PATENTS

| Number | Name | Date |
|---|---|---|
| 1,845,835 | Frankenburger et al. | Feb. 16, 1932 |
| 1,915,965 | Williams | June 27, 1933 |
| 2,567,445 | Parker | Sept. 11, 1951 |

OTHER REFERENCES

Gunther et al.: Article abstracted in Chemical Abstracts, v. 23, p. 1572, 1929. Original article in Z. Electrochem. 34, 616, 25 (1928).